April 23, 1957 W. M. BARKER 2,790,159

LINE CIRCUIT FOR CODE COMMUNICATION SYSTEMS

Filed Dec. 7, 1953 2 Sheets-Sheet 1

INVENTOR.
W. M. BARKER
BY Forest B. Hitchcock
HIS ATTORNEY

LINE CIRCUIT FOR CODE COMMUNICATION SYSTEMS

Filed Dec. 7, 1953 2 Sheets-Sheet 2

INVENTOR.
W.M. BARKER
BY Forest B. Hitchcock
HIS ATTORNEY

United States Patent Office 2,790,159

Patented Apr. 23, 1957

2,790,159

LINE CIRCUIT FOR CODE COMMUNICATION SYSTEMS

William M. Barker, Scottsville, N. Y., assignor to General Railway Signal Company, Rochester, N. Y.

Application December 7, 1953, Serial No. 396,707

4 Claims. (Cl. 340—163)

Figure 1A:
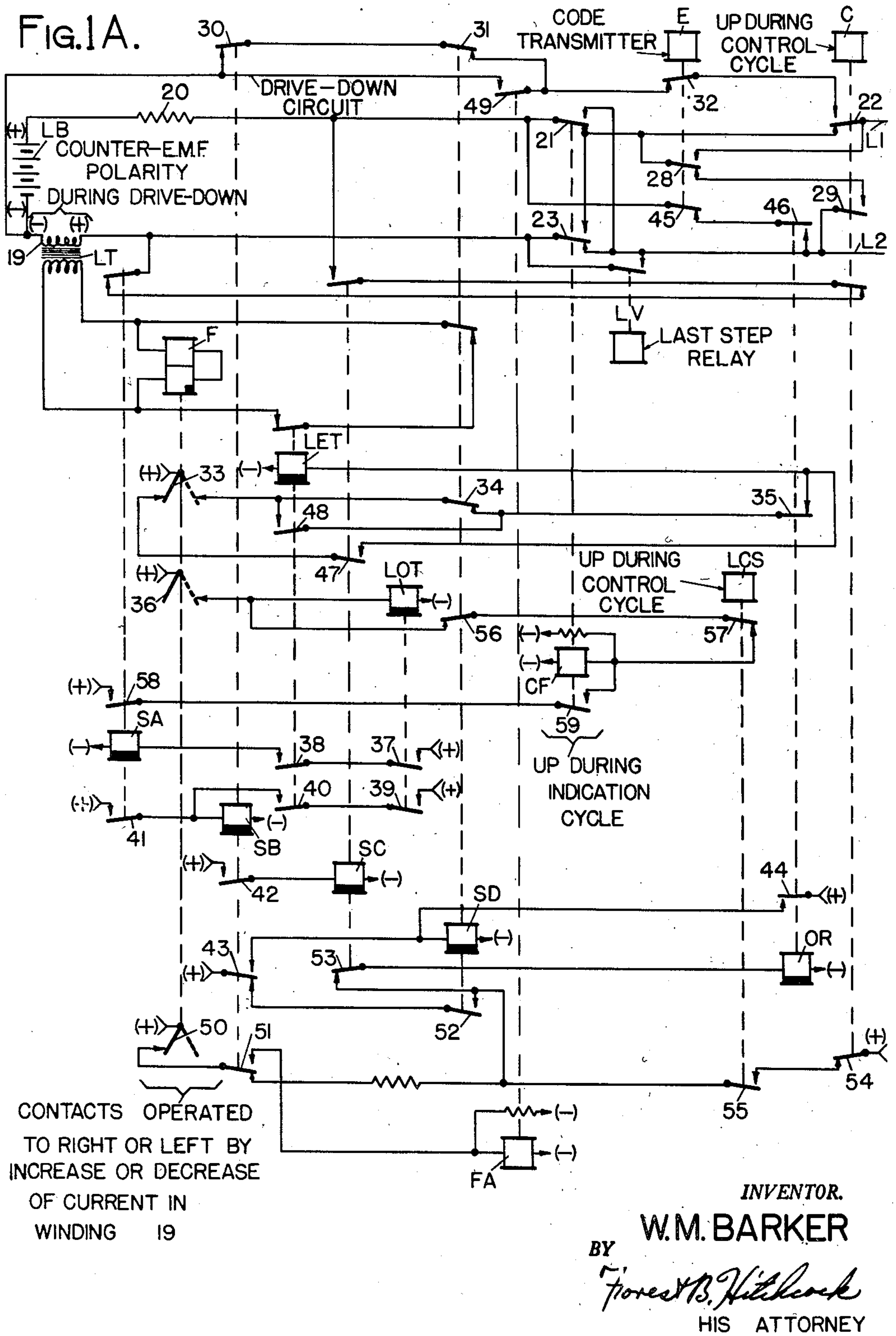

This invention relates to code communication systems such as are used in railway centralized traffic control systems, and it more particularly pertains to improved line circuit means for such systems.

One problem in line circuits for code communication systems is to insure the quick response of line relays at various field stations remote from a control office to line circuit conditions of energization and deenergization transmitted from a control office, particularly where relatively long line and/or cable circuits are involved.

The system according to the present invention comprises a line circuit connecting a control office with a plurality of field stations wherein energization of the line circuit is from a direct current source at the control office. The line circuit includes an inductive element at the control office in series with the direct current source during pulse transmission. This inductive element is the primary winding of an impulse transformer, the secondary winding of which is connected to a line relay of the magnetic stick type so that this relay becomes operated in response to changes in current passing through the primary winding of the impulse transformer.

Upon termination of a period of energization of the line circuit, the primary winding of the impulse transformer is directly connected in series with the direct current source for the line. This causes a substantial increase in current through the primary winding of the impulse transformer which, of course, is opposed by a relatively high back electromotive force. At the time of connection of the direct current source, the primary winding of the impulse transformer is also directly connected in multiple across the line wires extending to the field stations in such a way that the back electromotive force thus produced in the primary winding is connected across the line wires with a polarity which is opposite to that polarity by which these line wires have just been energized from the direct current source. This connection of the primary winding across the line wires is of short duration, but the temporary presence of this back electromotive force of opposite polarity has a drive-down effect upon the line relays at the various field stations which tends to shorten their dropping away time.

Although the drive-down circuit which connects the primary winding of the impulse transformer across the line wires is only temporarily closed, the connection of this winding across the direct current source continues until the beginning of the next period of energization of the line circuit. Thus, considerable energy is stored in the impulse transformer. At the beginning of the next period of energization of the line circuit, the primary winding of the impulse transformer is connected in series with the direct current source across the line wires, so that a voltage much higher than that of the direct current source is applied to the line wires. This is because the energy stored in the impulse transformer produces a potential of a polarity which is additive to the potential of the battery. It is, of course, understood that this polarity of the stored energy in the impulse transformer is just the reverse of that indicated in the drawings for the counter-electromotive force effective during the drive-down operation. This relatively high voltage applied to the line wires quickly effects the picking up of the line relays, but it persists only during the decay of the flux in the impulse transformer to a normal value.

An object of the present invention is to employ the counterelectromotive force of an inductive device to drive-down the field station line relays in a centralized traffic control system upon termination of a period of energization of the line circuit.

Another object of the present invention is to use the counterelectromotive force of the inductive device in series with the direct current line circuit supply to apply a relatively high voltage momentarily across the line wires at the beginning of each period of energization of the line wires extending from the control office to the field stations.

Other objects, purposes and characteristic features of the present invention will be in part obvious from the accompanying drawings, and in part pointed out as the description of the invention progresses.

Figure 1B:
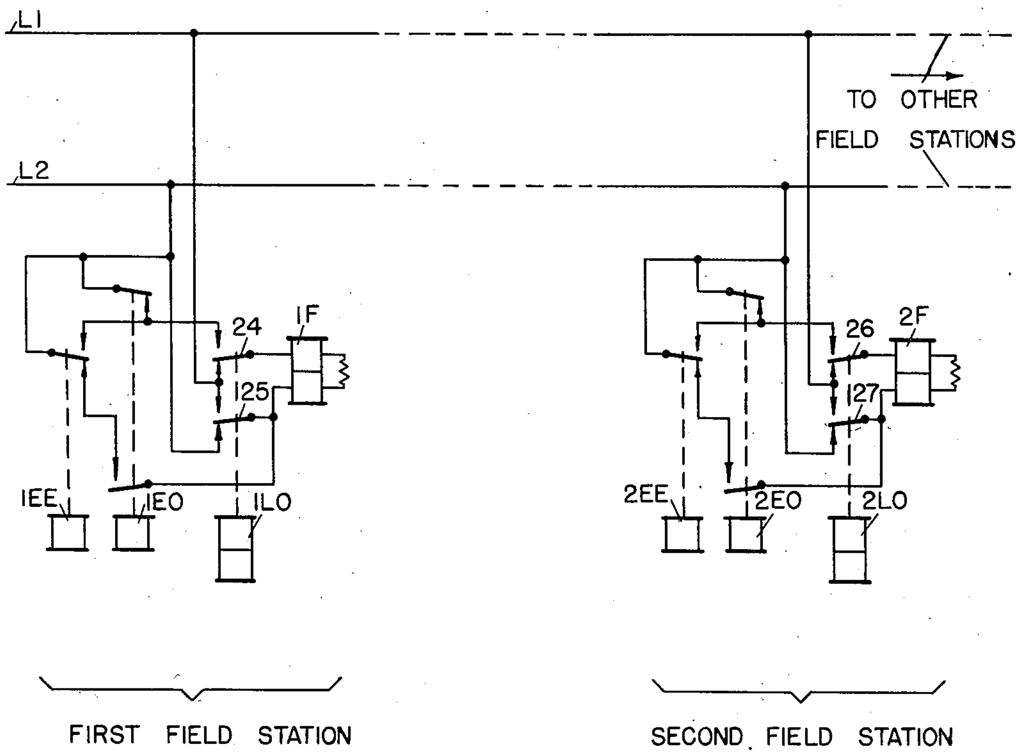

In describing the invention in detail, reference is made to the accompanying drawings in which similar parts are identified by similar letter reference characters and in which Figs. 1A and 1B when placed side by side illustrate the line circuit organization for one embodiment of the present invention.

For the purpose of simplifying the illustrations and facilitating in the explanation thereof, the various parts and circuits constituting this embodiment of the present invention have been shown diagrammatically, and certain conventional illustrations have been employed, the drawings having been made more with the purpose of facilitating the disclosure of the present invention as to its principles and mode of operation, than for the purpose of illustrating the specific construction and arrangement of parts that would be employed in practice. The symbols (+) and (—) are used to indicate connections to the respective positive and negative terminals of suitable sources of direct current.

With reference to Figs. 1A and 1B, a line circuit is provided having the line wires L1 and L2 connecting apparatus at a control office with apparatus at a plurality of remotely spaced field stations.

A line relay F is provided at the control office and at each of the field stations for operation in accordane with the pulsing of the line circuit. The line relay F at the control office is of the magnetic stick type in that it is a two position relay that is magentically maintained in its last operated position until the application of energy of the opposite polarity. The line relays F at the respective field stations are generally of the biased polar type in that they are spring biased to a particular position to which they are restored whenever deenergized. An impulse transformer LT is provided for operation of the line relay F at the control office in accordance with changes in current in the line circuit. The primary winding 19 of this transformer is also used to improve the line circuit characteristics.

Code transmission is effected at the control office during a control cycle of operation by the selective pulsing of a code transmitter relay E, and similarly at the field stations relays EE and EO are used as code transmitter relays for the transmission of indications from the field stations to the control office.

Relays C and LCS are provided at the control office for initiating a control cycle of operation in response to manual designation. These relays are energized only for the transmission of control cycles, and similarly a relay CF is provided at the control office which is energized only for the transmission of indication cycles.

Slow drop away relays LOT and LET are provided at the control office as odd and even digit timer relays for timing the selected long on and off periods of the line circuit.

Slow drop away relays SA, SB, SC and SD are provided at the control office as slow acting clear out relays, these relays being normally picked up during the conditioning period at the beginning of each cycle of operation and being dropped out in the clear out period at the end of each cycle of operation. A normally energized relay OR is provided at the control office for use in establishing the length of the conditioning period at the beginning of a cycle of operation and for use in termination of the clear out period at the end of each cycle of operation.

A relay LO is provided at each of the field stations as a relay that is picked up when the associated field station is transmitting to the control office.

Additional code communication apparatus is provided for the selection of the codes to be transmitted, for the stepping, and for decoding and registration purposes in accordance with the usual practice for code communication systems of this type. This apparatus can be provided, for example, as is disclosed in the U. S. Patent No. 2,399,734 of Hailes et al., dated May 7, 1946.

Having thus described the general organization of the system according to the present invention, more detailed consideration will be given as to the circuit organization when considering typical conditions of the operation of the system.

*Operation*

The centralized traffic control system to which this embodiment of the present invention is assumed to be applied is of the type that is normally at rest and subject to initiation from either the control office or any of the field stations into respective control and indication cycles of operation. When the system is not in an operating cycle, it is assumed to be at rest, and the condition of the relays illustrated in the drawings is the condition that these relays assume when the system is at rest.

The line circuit is energized at this time with the (+) terminal of the line battery LB connected to the line wire L1 and the (−) terminal of the line battery connected to line wire L2. For consideration of different conditions of the line circuit, this condition will be assumed as a condition providing a positive polarity of energization of the line circuit. The (+) terminal of the line battery LB is connected to the line wire L1 through a suitable limiting resistor 20, back contact 21 of relay CF, and back contact 22 of relay C. The (−) terminal of the line battery LB is connected to the line wire L2 through the primary winding 19 of the impulse transformer LT and back contact 23 of relay CF.

At the first field station away from the control office, the line relay 1F is connected across the line wires L1 and L2 when the system is at rest through back contacts 24 and 25 of relay 1LO. Similarly, at the next field station, the line relay 2F is connected across the line wires L1 and L2 through back contacts 26 and 27 of relay 2LO.

To consider the mode of operation during a control cycle, it will be assumed that a control is designated at the control office for transmission and that the relays LCS and C are successively picked up in accordance with such designation. The picking up of relay C opens the line circuit at back contact 22 and applies a shunt across the line battery LB through the limiting resistor 20, back contact 28 of relay E, front contact 29 of relay C, back contact 23 of relay CF, and primary winding 19 of the impulse transformer LT.

At the same time, the primary winding 19 of the impulse transformer LT has a high voltage set up therein polarized as indicated by the (+) and (−) signs as shown in Fig. 1A wherein the (−) side of the primary winding 19 is connected to the line wire L1 which has previously been connected to the (+) side of the line battery LB, and the (+) side of the winding 19 of the impulse transformer LT is connected to the line wire L2 which has previously been energized from the (−) terminal of the line battery LB. Thus, the (−) terminal of the winding 19 of the impulse transformer LT is connected to line wire L1 through back contact 30 of relay SB, back contact 31 of relay SD, back contact 32 of relay E, and front contact 22 of relay C, and the line wire L2 is connected to the (+) terminal of the primary winding 19 of the impulse transformer LT through back contact 23 of relay CF, the same as under normal conditions when the system is at rest.

The increase in current in the impulse transformer LT energizes the line relay F at the control office with a polarity to actuate its contacts to right hand positions, and thus pick up circuits are closed for the relays LET and LOT, and the relay OR is deenergized. The circuit by which the relay LET is picked up extends from (+), including contact 33 of relay F in its right hand position, back contact 34 of relay SD, front contact 35 of relay OR, and winding of relay LET, to (−). Relay LOT is energized directly through contact 36 of relay F in its right hand position. When relay LET is picked up, a stick contact 48 shunts back contact 34 out of the pick up circuit that has been described.

Upon the picking up of relays LET and LOT, relays SA and SB become energized. Relay SA is energized through front contact 37 of relay LOT and front contact 38 of relay LET, and similarly relay SB is energized through front contact 39 of relay LOT and front contact 40 of relay LET. Relay SA is sufficiently slow acting to be maintained picked up when its pick up circuit is momentarily opened from time to time during the normal operation of the system in a cycle of operation, and relay SB is energized directly through front contact 41 of relay SA. Relay SB when picked up causes the picking up of relays SC and SD upon the closure of front contacts 42 and 43 respectively. Relay SD is held until the picking up of relay OR at the end of the clear out period at the end of a cycle by energization through back contact 44 of relay OR.

The picking up of relay SB opens the circuit that has been described connecting the (−) terminal of the primary winding 19 of the impulse transformer LT to the line wire L1 at back contact 30, thus terminating the energization of the line wires L1 and L2 with drive-down energy from the winding 19 of the impulse transformer LT. The energization of the line wires L1 and L2 with drive-down energy has been sustained for a sufficient period of time to have caused the dropping away of the line relays F at the respective field stations, but it is removed so that the line circuit does not become fully energized with a negative polarity.

After a time determined by the slow drop away characteristics of relay OR, relay OR becomes dropped away upon the opening of its circuit at contact 50 of relay F; and the dropping away of relay OR opens the circuit for relay LET at front contact 35 so as to cause this relay to be dropped away. Upon the dropping away of the relay LET, the code transmitter relay E becomes picked up to initiate transmission of the first character of a code which is selected as long or short in accordance with the control that has been designated for transmission. The picking up of relay E removes the shunt across the line battery LB by the opening of back contact 28, and also removes a second shunt across the battery LB that has been closed through back contact 45 of relay E and back contact 46 of relay OR. The line battery LB now has its (+) terminal connected to line wire L1 through the limiting resistor 20, back contact 21 of relay CF, and front contact 28 of relay E. The (−) terminal of the line battery LB is connected to line wire L2 at this time through the same circuit that has been described as being normally closed when the system is at rest.

The decrease in current through the primary winding 19 sets up a high counter electromotive voltage of a polarity opposite to the polarity upon increase in current. Thus, this voltage is in series with the line battery LB, the left hand end of winding 19 being momentarily (+) and the right hand end of the winding 19 being momentarily (−). The line circuit is therefore initially charged by the application of a voltage much higher than the voltage of the line battery LB alone, and the line relays F at the field station are quicker to respond to the energization of the line circuit than would be the case if the counter-electromotive force of the winding 19 were not applied in series with the voltage of the line battery LB.

The decrease in current through the primary winding 19 of the impulse transformer LT induces a voltage in the secondary winding of the transformer LT of a polarity to actuate the contacts of the line relay F at the control office to their left hand positions. This deenergizes the odd digit timer LOT by the opening of contact 36, and it closes a pick up circuit for relay LET including contact 33 of relay F in its left hand position and front contact 47 of relay SC.

Upon termination of the period of energization during the first step of the control cycle, the code transmitter relay E is dropped away, and the dropping away of this relay shunts the line battery LB as has been heretofore described. The primary winding 19 of the impulse transformer LT again has its negative terminal connected to the line wire L1 for drive-down, this connection now being through front contact 49 of relay FA, back contact 32 of relay E, and front contact 22 of relay C. Relay FA is picked up at this time because of the energization of a circuit through contact 50 of relay F in its left hand position and front contact 51 or relay SB.

Having thus described the mode of operation involved in the control of the line circuit during the first step, it will be readily apparent that a similar mode of operation is effective for each of the other steps of a control cycle.

Upon termination of the last step of the control cycle, the line battery LB becomes shunted by the dropping away of the code transmitter relay E in the same manner as has been described, and the winding 19 of the impulse transformer LT is connected across the line wires L1 and L2 for drive-down as has been described until the dropping away of relay FA in response to the operation of the contacts of the line relay F to their right-hand positions. Relay FA is deenergized upon the opening of contact 50 of line relay F, and relay LET is deenergized by the opening of contact 33 of relay F. The relay LET is dropped away after a time, and the dropping away of this relay causes the dropping away of relay SA by the opening of front contact 38. The dropping away of relay SA causes the dropping away of relay SB by opening its circuit at front contact 41, and relay SB upon dropping away causes the dropping away of relay SC by the opening of its circuit at front contact 42. A circuit is closed at this time for picking up relay OR extending from (+), through back contact 43 of relay SB, front contact 52 of relay SD, back contact 53 of relay SC, and winding of relay OR, to (−). This relay when picked up is maintained energized during a period of rest by a circuit extending from (+), including contact 50 of relay F in its left hand position, back contact 51 of relay SB, back contact 53 of relay SC, and winding of relay OR, to (−).

The picking up of relay OR removes the shunt which has been across the line battery LB through the winding 19 of the impulse transformer LT during the clearout period by the opening of back contact 46. The shunt including front contact 29 of relay C has been opened prior to this time by the dropping away of relay C in response to the dropping away of relay SC. Upon removal of the shunt from the line battery LB, energy of a positive polarity is applied to the line wires L1 and L2 by the energization of a circuit that has been described as being normally effective during a period of rest.

During an indication cycle of operation, transmission is from a field station or stations initiating the cycle by the selectve shunting of the line wires L1 and L2. This transmission is accomplished at field station No. 1 by the code transmitter relays 1EE and 1EO and at field station No. 2 by relays 2EE and 2EO.

When an indication cycle is initiated, the relay CF becomes picked up by the energization of a circuit extending from (+), including contact 36 of line relay F in its right hand position, back contact 56 of relay SD, back contact 57 of relay LCS, and winding of relay CF, to (−). This relay is maintained picked up throughout the cycle by a stick circuit including front contact 58 of relay SA and front contact 59 of relay CF.

With relay CF picked up, the line wires L1 and L2 are energized with negative polarity because of the pole changing of the line by contacts 21 and 23 of the indication cycle control relay CF. There can be no drive-down provided for the line relays as has been described during a control cycle because the transmitting is done from the different field stations rather than from the control office.

Having thus described the line circuit control system of a centralized traffic control system as one embodiment of the present invention, it is desired to be understood that various modifications, adaptations and alterations may be made to the specific form shown within the scope of the present invention except as limited by the appended claims.

What I claim is:

1. In a code communication system for the communication of selected control codes from a control office to a field station, a source of direct current at the control office, an impulse transformer at the control office having primary and secondary windings, a line relay at the control office having its windings connected to said secondary winding of said impulse transformer, a line relay at said field station, line wires connecting the control office and said line relay at said field station, circuit means at the control office for applying time spaced energization pulses to the line wires of a given plurality from said direct current source and through the primary winding of said impulse transformer, said circuit means being effective upon the termination of each period of energization of said line wires to connect said primary winding of said impulse transformer across the line wires with its counterelectromotive force polarized opposite to the polarity by which the line wires have last been energized, whereby the line relay at the field station is driven down at the end of each code pulse by a pulse of energization of the opposite polarity generated by the primary winding of said impulse transformer.

2. In a code communication system for the transmission of selected control codes from a control office to a field station, a source of direct current and an impulse transformer having primary and secondary windings at the control office, a line relay at the control office connected across the secondary winding of said impulse transformer, a line relay at the field station, line wires connecting the control office and said line relay at the field station, code transmitting means at the control office operable to apply time spaced pulses of energization to said line wires from said source of energy in series with the primary winding of said impulse transformer, said code transmitting means being effective during the time spaces between said pulses to shunt said source of energy through the primary winding of said impulse transformer, and said code transmitting means being effective upon termination of each pulse transmitted to connect the primary winding of said impulse transformer across said line wires with such a polarity that the counterelectromotive force set up by an increase in current through the primary winding of the impulse transformer because of the shunt is opposite to the polarity by which the line wires have last been energized.

3. In a code communication system of the character desecribed for the transmission of control codes from a control office to a field station, a source of direct current and an inductive device at the control office, a line relay at the field station, line wires connecting the control office and the line relay at the field station, code transmitting means at the control office operable to apply time spaced pulses of energy to said line wires from said source of energy in series with said inductive device, said code transmitting means being effective during the time spaces to shunt said source of energy through said inductive device and thereby increase the current through said inductive device, and said code transmitting means being effective upon the termination of each pulse to connect said inductive device across said line wires with a polarity such that the counterelectromotive force set up by an increase in current through the inductive device is opposite to the polarity by which the line wires have last been energized.

4. In a code communication system for the transmission of selected control codes from a control office to at least one field station, a source of direct current and an inductive device at the control office, a line relay at each field station, line wires connecting the control office and said line relay, code transmitting means at the control office operable to apply time spaced pulses of energization to said line wires from said source of energy in series with said inductive device, said code transmitting means being effective during the time spaces to shunt said source of energy through said inductive device and thereby increase the current through said inductive device, and said code transmitting means being effective upon the termination of each pulse to connect said inductive device just momentarily across said line wires with a polarity such that the counterelectromotive force set up by an increase in current through the inductive device is opposite to the polarity by which the line wires have last been energized.

References Cited in the file of this patent

UNITED STATES PATENTS 2,279,123 Lewis ------------------ Apr. 7, 1942